July 27, 1971 NORIO TSUBOUCHI ET AL 3,595,795

PIEZOELECTRIC CERAMIC

Filed Nov. 8, 1968 3 Sheets-Sheet 1

INVENTORS
NORIO TSUBOUCHI
MASAO TAKAHASHI
TOMEJI OHNO
TSUNEO AKASHI

BY Hopgood & Calimafde
ATTORNEYS

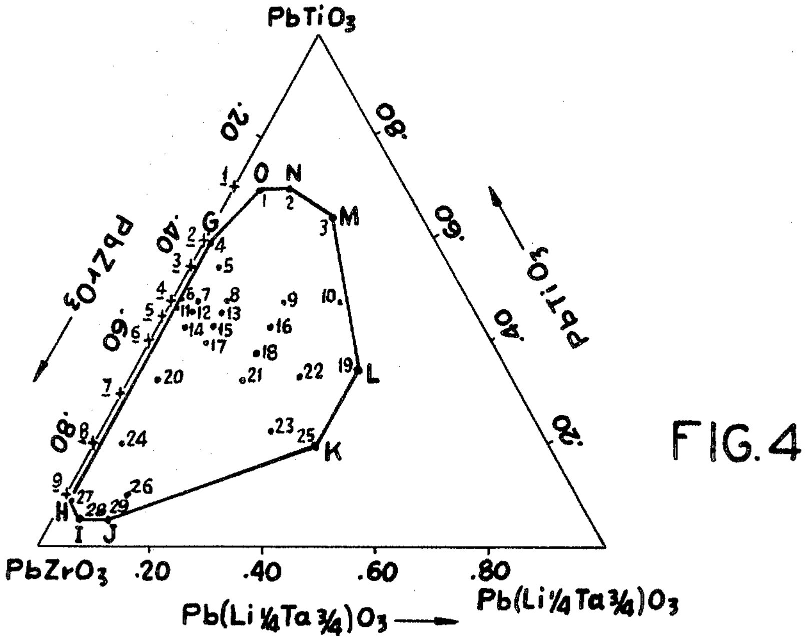
FIG. 4
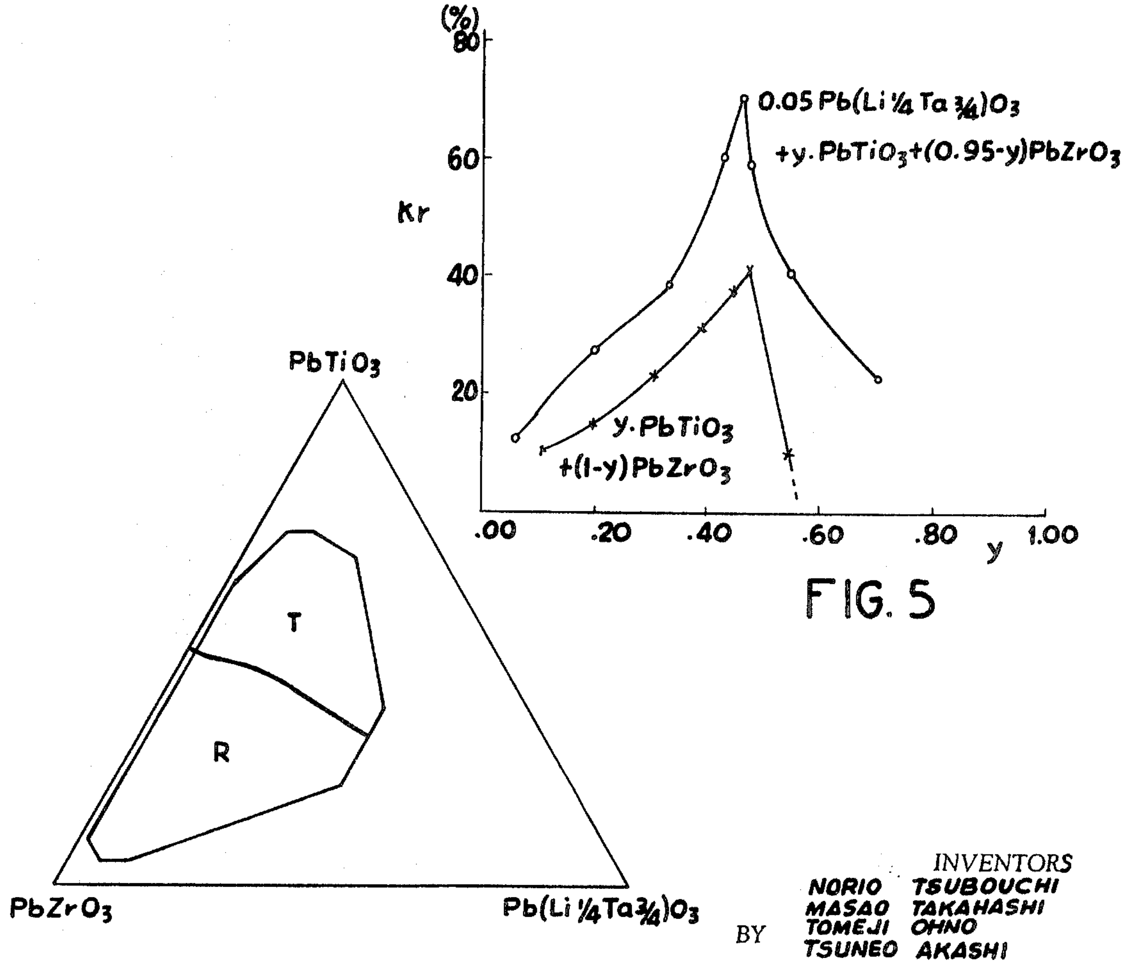
FIG. 5
FIG. 6
INVENTORS
NORIO TSUBOUCHI
MASAO TAKAHASHI
TOMEJI OHNO
TSUNEO AKASHI
BY
Hopgood & Calimafde
ATTORNEYS INVENTORS
NORIO TSUBOUCHI
MASAO TAKAHASHI
TOMEJI OHNO
TSUNEO AKASHI
BY Hopgood & Calimafde
ATTORNEYS

United States Patent Office 3,595,795
Patented July 27, 1971

3,595,795
PIEZOELECTRIC CERAMIC

Norio Tsubouchi, Masao Takahashi, Tomeji Ohno, and Tsuneo Akashi, Tokyo-to, Japan, assignors to Nippon Electric Company, Limited, Tokyo, Japan
Filed Nov. 8, 1967, Ser. No. 681,494
Claims priority, application Japan, Nov. 11, 1966, 41/74,371, 41/74,372; Nov. 26, 1966, 41/77,372; May 26, 1967, 42/33,509; June 19, 1967, 42/39,854, 42/39,855
Int. Cl. C04b *35/46, 35/48*
U.S. Cl. 252—62.9 4 Claims

ABSTRACT OF THE DISCLOSURE

A piezoelectric ceramic is disclosed consisting essentially of a solid solution of the three components $Pb(Li_{1/4}Z_{3/4}O_3$, $PbTiO_3$ and $PbZrO_3$, wherein Z represents one element selected from the group consisting of Nb, Ta and Sb.

Figure 1:
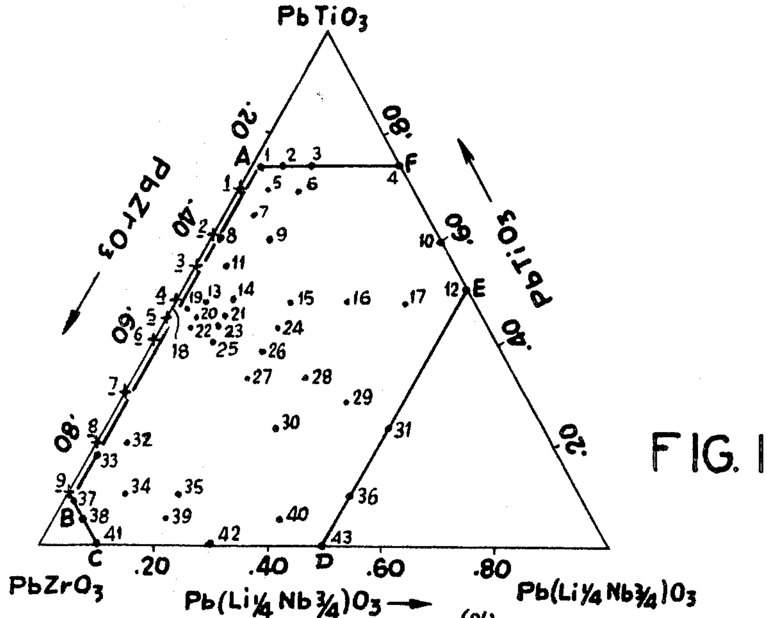

This invention relates to piezolectric materials and more particularly to novel piezoelectric ceramics having excellent properties suitable for use in particular fields.

One of the typical fields of application of piezoelectric materials is manufacture of transducers for transmitting and receiving ultrasonic waves. In this case, the electromechanical coupling factor is the most essential measure for evaluating in practice the properties of piezoelectric materials to be used. The electromechanical coupling factor is a representative of the efficiency of transforming the electric oscillation into mechanical vibration and of conversely transforming the mechanical vibration into electrical oscillation, greater value thereof standing for better efficiency of interconversion and being desired for piezoelectric materials to be used in manufacture of transducers.

Piezoelectric materials have some other fundamental factors, such as dielectric loss, dielectric constant and mechanical quality factor, serving for evaluation thereof. As for piezoelectric materials for transducers, the dielectric loss is desired to be small, the desirable value of the dielectric constant is large or small depending on electric loads, and the mechanical quality factor is not so much important.

The above matters are described in detail in, for example, D. Berlincourt et al., "Transducer Properties of Lead Titanate Zirconate Ceramics," IRE Transactions on Ultrasonic Engineering, February 1960, pp. 1–6 and R. C. V. Macario, "Design Data for Band-Pass Ladder Filters Employing Ceramic Resonators," Electronic Engineering, vol. 33, No. 3 (1961), pp. 171–177.

It has been often true, however, that conventional piezoelectric ceramics, for example, barium titanate ($BaTiO_3$) and lead titanate zirconate $[Pb(Ti \cdot Zr)O_3]$ have the small electromechanical coupling factor and are unfit for the practical use. Improvement of this factor has been made only by way of incorporating various additional constituents into the ceramics.

The object of this invention is to provide a novel piezoelectric ceramic having the large electromechanical coupling factor.

The other object of this invention is to provide a novel piezoelectric ceramic suited for use in particular fields such as manufacture of transducers for transmitting and receiving ultrasonic waves.

This invention is based on the new discovery that the ceramic composition consisting essentially of a solid solution of $Pb(Li_{1/4}Z_{3/4})O_3$-$PbTiO_3$-$PbZrO_3$ ternary system, where Z represents one element selected from Nb, Ta and Sb, shows the excellent piezoelectric activity and hence has the practical utility.

This ceramic composition contains lead (Pb) as a divalent metallic element and also titanium (Ti) and zirconium (Zr) as tetravalent metallic elements. Moreover, the element lithium (Li) and one element selected from niobium (Nb), tantalum (Ta) and antimony (Sb) are contained in such a proportion that they may be, as a whole, substantially equivalent to a tetravalent metallic element.

In case that niobium (Nb) is selected for Z and that the ceramic of the $Pb(Li_{1/4}Nb_{3/4})O_3$-$PbTiO_3$-$PbZrO_3$ ternary system is represented by the compositional formula $[Pb(Li_{1/4}Nb_{3/4})O_3]_x[PbTiO_3]_y[PbZrO_3]_z$ where $x$, $y$ or $z$ is the mol ratio of each component and $x+y+z=1.00$, it has been found that this composition should be restricted in view of its effective properties within the range determined by the following combination of the mol ratios $x$, $y$ and $z$:

| x | y | z |
|---|---|---|
| 0.01 | 0.75 | 0.24 |
| 0.01 | 0.09 | 0.90 |
| 0.10 | 0.00 | 0.90 |
| 0.50 | 0.00 | 0.50 |
| 0.50 | 0.50 | 0.00 |
| 0.25 | 0.75 | 0.00 |

Also, when tantalum (Ta) is selected for Z, the effective range of the ceramic composition given by the formula $$[Pb(Li_{1/4}Ta_{3/4})O_3]_x[PbTiO_3]_y[PbZrO_3]_z$$

where $x+y+x=1.00$ should be within the range defined by the following combination of the mol ratios $x$, $y$ and $z$:

| x | y | z |
|---|---|---|
| 0.01 | 0.60 | 0.39 |
| 0.01 | 0.09 | 0.90 |
| 0.05 | 0.05 | 0.90 |
| 0.10 | 0.05 | 0.85 |
| 0.40 | 0.20 | 0.40 |
| 0.40 | 0.35 | 0.25 |
| 0.20 | 0.65 | 0.15 |
| 0.10 | 0.70 | 0.20 |
| 0.05 | 0.70 | 0.25 |

Also, when antimony (Sb) is selected for Z, the effective range of the ceramic composition given by the formula $[Pb(Li_{1/4}Sb_{3/4})O_3]_x[PbTiO_3]_y[PbZrO_3]_z$, where $x+y+z=1.00$, is decided by the following combination of the mol ratios $x$, $y$ and $z$:

| x | y | z |
|---|---|---|
| 0.01 | 0.70 | 0.29 |
| 0.01 | 0.09 | 0.90 |
| 0.05 | 0.05 | 0.90 |
| 0.30 | 0.05 | 0.65 |
| 0.30 | 0.50 | 0.20 |
| 0.10 | 0.70 | 0.20 |

Among the conventional piezoelectric ceramics, known is a ceramic of the $Pb(Mg_{1/3}Nb_{2/3})O_3$-$PbTiO_3$-$PbZrO_3$ ternary system, which is disclosed in the U.S. Pat. 3,268,453 granted Aug. 23, 1966 to H. Ouchi et al. This conventional composition, however, does not improve by itself the piezoelectric properties of the previous $PbTiO_3$-$PbZrO_3$ ceramics, and an excellent piezoelectric ceramic is obtained only by adding thereto at least one of oxides of manganese, cobalt, nickel, iron and chromium as additional constituents up to 3 weight percent. In contrast, the $Pb(Li_{1/4}Z_{3/4})O_3$-$PbTiO_3$-$PbZrO_3$ composition of this invention where Z represents Nb, Ta or Sb remarkably improves the piezoelectric properties by itself (without any additional constituent). This difference in improvement of piezoelectric properties between the conventional composition and the novel composition of this invention is, it is believed, due to the fact that the conventional composition uses in its basic composition magnesium (Mg), an element belonging to the Group II–A in the Periodic Table, in conjunction with a Group V–B element niobium (Nb), while in the composition of this invention a Group I–A element lithium (Li) is used in conjunction with a Group V–B or V–A element niobium (Nb), tantalum (Ta) or antimony (Sb).

Excellent piezoelectric activities of the ceramic composition of this invention will be apparent from the following more particular description of a preferred example of this invention, as illustrated in the accompanying drawings.

Figures 2, 3:
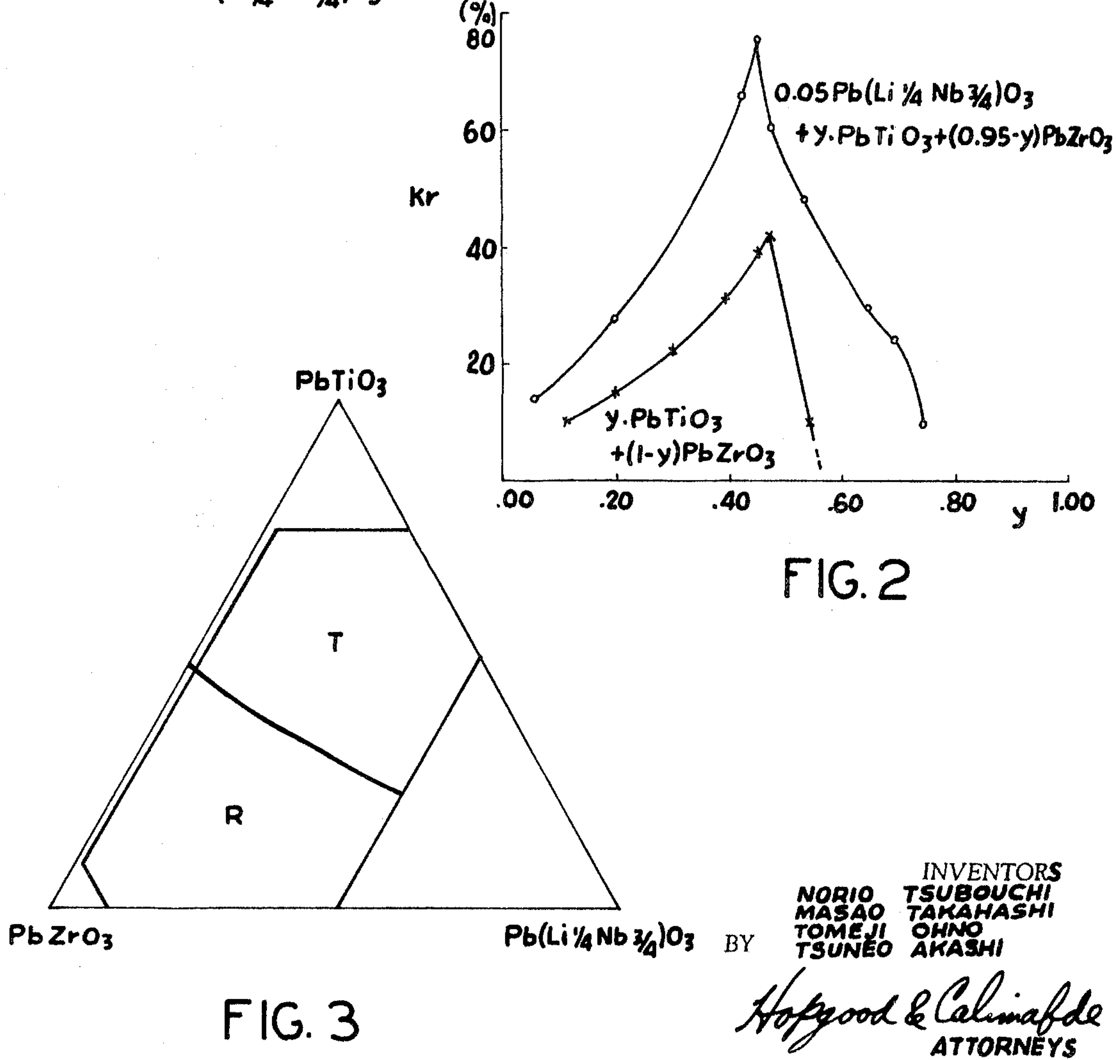
Figure 7:
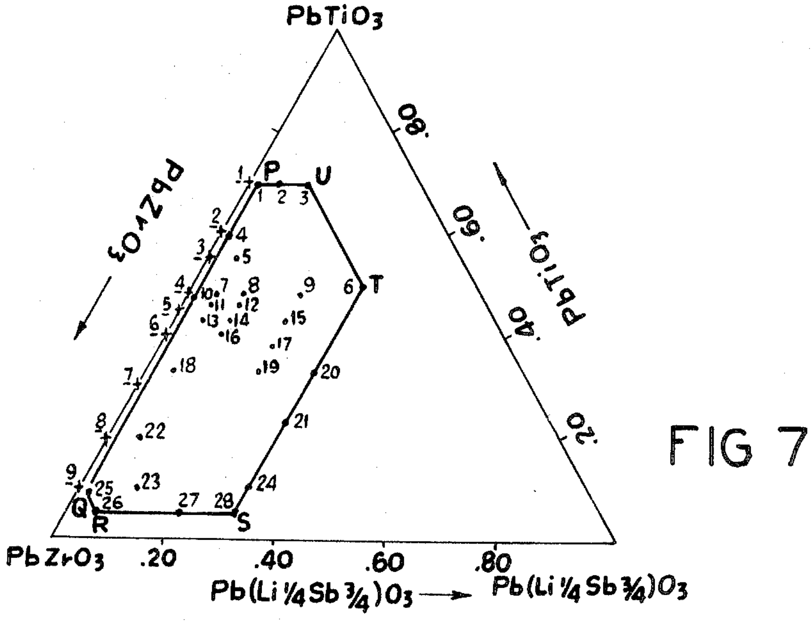
Figures 8, 9:
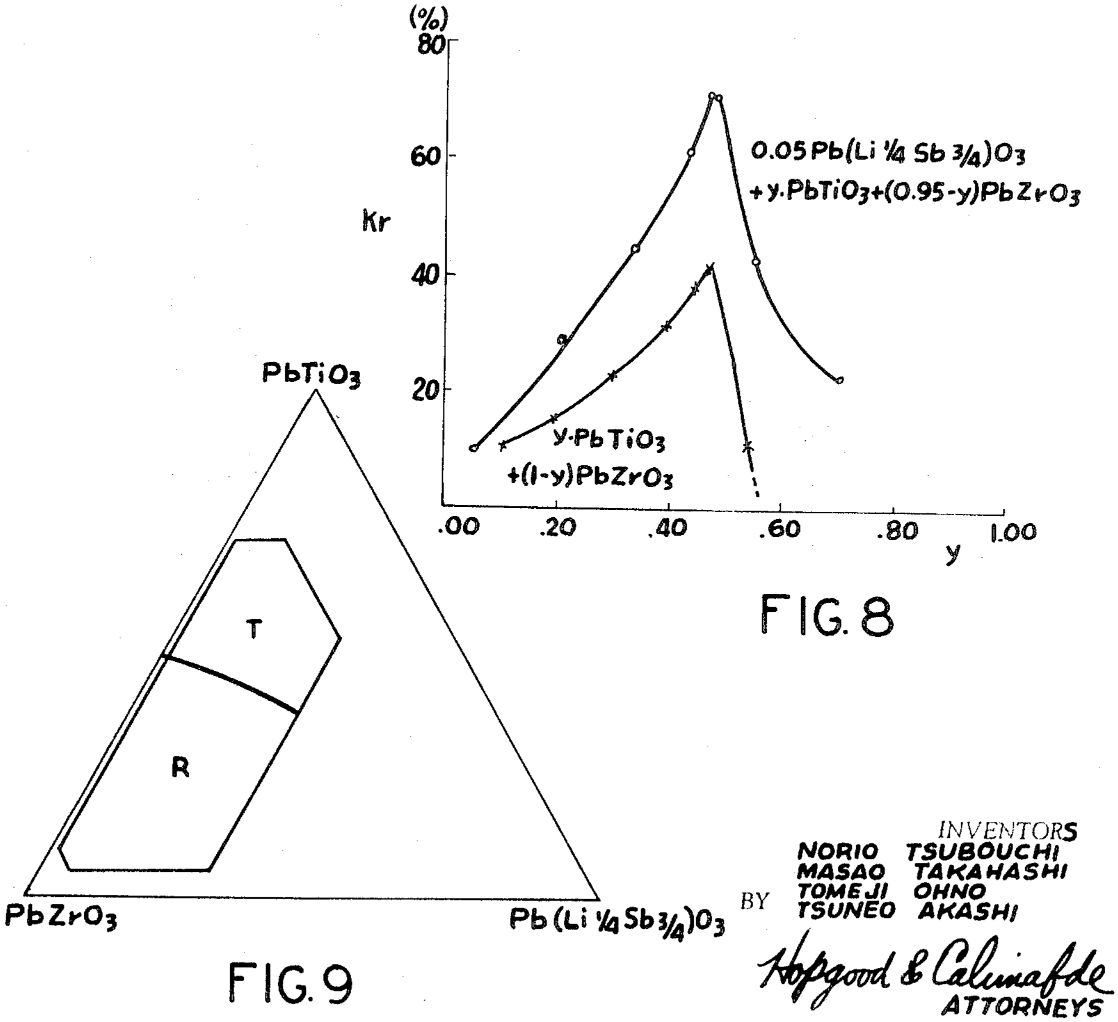

In the drawings:

FIGS. 1, 4 and 7 are the triangular compositional diagrams of the ternary system showing both the effective ranges of the compositions of this invention and the specific compositions of the example;

FIGS. 2, 5 and 8 are graphs showing the electromechanical coupling factors of both the conventional lead titanate-lead zirconate ceramic and the ceramic of this invention, as a function of compositional change of lead titanate and lead zirconate in both the ceramics; and FIGS. 3, 6 and 9 are the triangular compositional diagrams of the ternary system showing the crystal structures of the ceramics of this invention; while FIGS. 1, 2 and 3 are for the novel ternary system $Pb(Li_{1/4}Nb_{3/4})O_3$-$PbTiO_3$-$PbZrO_3$ among the ceramic compositions of this invention;

FIGS. 4, 5 and 6 are for the novel ternary system $Pb(Li_{1/4}Ta_{3/4})O_3$-$PbTiO_3$-$PbZrO_3$ among the ceramic compositions of this invention; and FIGS. 7, 8 and 9 are for the novel ternary system $Pb(Li_{1/4}Sb_{3/4})O_3$-$PbTiO_3$-$PbZrO_3$ among the ceramic compositions of this invention.

EXAMPLES

Powdered materials of lead monoxide (PbO), lithium carbonate ($Li_2CO_3$), niobium pentoxide ($Nb_2O_5$), titanium dioxide ($TiO_2$), and zirconium dioxide ($ZrO_2$) were used as starting materials to obtain the $Pb(Li_{1/4}Nb_{3/4})O_3$-$PbTiO_3PbZrO_3$ ceramic of this invention, unless otherwise remarked. These powdered materials were so weighed that the final specimens may have the compositional proportions shown in Table 1. Also, powdered materials of lead monoxide (PbO), titanium dioxide ($TiO_2$), zirconium dioxide ($ZrO_2$), lithium carbonate ($Li_2CO_3$), and one of tantalum pentoxide ($Ta_2O_5$) and antimony trioxide ($Sb_2O_3$) were used as starting materials to obtain the $Pb(Li_{1/4}Ta_{3/4})O_3$-$PbTiO_3$-$PbZrO_3$ or $Pb(Li_{1/4}Sb_{3/4})O_3$-$PbTiO_3$-$PbZrO_3$ ceramic of this invention, unless otherwise remarked. These powders were also weighed in such a manner that the final specimens may have the compositional proportions shown in Table 2 or in Table 3. Here, lithium carbonate ($Li_2CO_3$) and antimony trioxide ($Sb_2O_3$) were weighed as calculated on the basis of lithium oxide ($Li_2O$) and antimony pentoxide ($Sb_2O_5$), respectively. In addition, the powder of lead monoxide, titanium dioxide and zirconium dioxide were weighed to obtain the conventional lead titanate-lead zirconate ceramics having the compositional proportions shown in Table 4.

The respective powders were mixed in a ball mill with ethyl alcohol. The mixed powders were subjected to filtration, dried, crushed, then pre-sintered at 900° C. for one hour, and again crushed. Thereafter, the mixtures, with a small amount of distilled water being added thereto, were press-molded into discs of 20 mm. in diameter at a pressure of 700 kg./cm.² and sintered in an atmosphere of lead monoxide (PbO) for one hour at a temperature between 1260° C. and 1300° C. As for the specimens containing 30 mol percent or more $Pb(Li_{1/4}Ta_{3/4})O_3$ (Nos. 10, 19, 22, 23 and 25 of Table 2) and those containing 30 mol percent or more $Pb(Li_{1/4}Sb_{3/4})O_3$ (Nos. 6, 20, 21, 24 and 29 of Table 3), however, a temperature between 1230° C. and 1260° C. was used on sintering. The resulting ceramic discs were polished on both surfaces to the thickness of one millimeter, provided with silver electrodes on both surfaces, and thereafter piezoelectrically activated through the polarization treatment at room temperature or at 100° C. for one hour under an applied D.-C. electric field of 30 to 50 kv./cm.

After the ceramic discs had been allowed to stand for 24 hours, the electromechanical coupling factor for the radial mode vibration ($k_r$) and the mechanical quality factor ($Q_m$) were measured to evaluate the piezoelectric activities. The measurement of these piezoelectric properties was made according to the IRE standard circuit. The value of $k_r$ was calculated by the resonant to antiresonant frequency method. The dielectric constant ($\epsilon$) and the dielectric loss (tan $\delta$) were also measured at a frequency of 1 kHz.

Tables 1, 2, 3 and 4 show typical results obtained. The results are for such specimens among those subjected to polarization treatment under the above-mentioned various conditions that have the greatest $k_r$ values. In the tables, the specimens are arranged according to the amount of the contained $PbTiO_3$ and there are also listed several values of Curie temperature which was determined through measurement of temperature variation in the dielectric constant ($\epsilon$). The novel compositions of the specimens of Tables 1, 2 and 3 are shown with black points in FIGS. 1, 4 and 7, respectively, while the conventional compositions of the specimens of Table 4 are indicated by crosses in the same figures.

Comparison of the results for the specimens Nos. 19 and 20 of Table 1, 11 and 12 of Table 2, or 10 and 11 of Table 3 with those for the specimen No. 4 of Table 4 will reveal that the greatest $k_r$ values of the novel ceramics of this invention are far superior to the maximum $k_r$ value of the conventional lead titanate zirconate ceramic which has been known as the most excellent piezoelectric ceramic. Moreover, comparison of the results in Table 1, 2 or 3 with those in Table 4, particularly between the novel and conventional ceramics in which the ratios of the amounts of contained $PbTiO_3$ and $PbZrO_3$ are similar to each other, will also indicate that the ceramics of this invention have a remarkably improved $k_r$ value. This latter fact will be more clearly understood from FIGS. 2, 5 or 8, wherein the curve of a thick line represents the $k_r$ values of a novel ceramic containing 5 mol percent of $Pb(Li_{1/4}Nb_{3/4})O_3$ [FIG. 2], $Pb(Li_{1/4}Ta_{3/4})O_3$ [FIG. 5], or $Pb(Li_{1/4}Sb_{3/4})O_3$ [FIG. 8], the varying amount $y$ of $PbTiO_3$ and the remaining amount of $PbZrO_3$, while the curve of a fine line shows the $k_r$ values of a conventional lead titanate zirconate ceramic with the varying amount $y$ of $PbTiO_3$.

As is seen from the above, this invention provides the excellent, useful piezoelectric ceramic compositions having superior piezoelectric activities.

In the novel ceramic of $$Pb(Li_{1/4}Z_{3/4})O_3\text{-}PbTiO_3\text{-}PbZrO_3$$

ternary system (Z is Nb, Ta or Sb) of this invention, the superior piezoelectric activities as mentioned above are available only when the composition represented by the formula $$[Pb(Li_{1/4}Z_{3/4})O_3]_x[PbTiO_3]_y[PbZro_3]_z$$

where $x$, $y$ and $z$ represent a set of mol ratios and $$x+y+z=1.00$$

and where Z represents one element selected from Nb, Ta and Sb, falls within the area A–B–C–D–E–F of FIG. 1 of the drawing in case Nb is selected for Z, within the area G–H–I–J–K–L–M–N–O of FIG. 4 of the drawing in case Ta is selected for Z, and within the area P–Q–R–S–T–U of FIG. 7 of the drawing in case Sb is selected for Z. The sets of mol ratios of the vertices of each area are as follows:

| | x | y | z |
|---|---|---|---|
| A | 0.01 | 0.75 | 0.24 |
| B | 0.01 | 0.09 | 0 90 |
| C | 0.10 | 0.00 | 0.90 |
| D | 0.50 | 0.00 | 0.50 |
| E | 0.50 | 0.50 | 0.00 |
| F | 0.25 | 0.75 | 0.00 |
| G | 0.01 | 0.60 | 0.39 |
| H | 0.01 | 0.09 | 0.90 |
| I | 0.05 | 0.05 | 0.90 |
| J | 0.10 | 0.05 | 0.85 |
| K | 0.40 | 0.20 | 0.40 |
| L | 0.40 | 0.35 | 0.25 |
| M | 0.20 | 0.65 | 0.15 |
| N | 0.10 | 0.70 | 0.20 |
| O | 0.05 | 0.70 | 0.25 |
| P | 0.01 | 0.70 | 0.29 |
| Q | 0.01 | 0.09 | 0 90 |
| R | 0.05 | 0.05 | 0.90 |
| S | 0.30 | 0.05 | 0.65 |
| T | 0.30 | 0.50 | 0.20 |
| U | 0.10 | 0.70 | 0.20 |

In case the content of $Pb(Li_{1/4}Nb_{3/4})O_3$, $$Pb(Li_{1/4}Ta_{3/4})O_3$$

or $Pb(Li_{1/4}Sb_{3/4})O_3$ is less than that falling within the above-mentioned area, it becomes impossible to complete the sintering in manufacture of the ceramic and besides the piezoelectric activities of the ceramic obtained are inferior to or nearly equal to those of the conventional lead titanate zirconate ceramic or otherwise, even if improved, insufficient for practical use. If the content of $$Pb(Li_{1/4}Z_{3/4})O_3$$

[Z is Nb, Ta or Sb] is more than that falling within the above-mentioned area, accomplishment of the sintering is difficult and a uniform solid solution of the three components is not obtainable, with the result that the piezoelectric activities of the ceramic deteriorate to make the practical use impossible. Where the content of $PbTiO_3$ is outside the above-mentioned area, it is difficult to sinter a dense ceramic and the product has not practicable piezoelectric activities. Finally, in case the content of $PbZrO_3$ does not fall within the above-mentioned area, there results an unuseful piezoelectric ceramic having markedly inferior piezoelectric activities.

In view of the above, it is determined that the ceramic of this invention, if required to apply to a practical use, should have the composition falling within any of the areas specified above. The ceramic of this effective composition shows excellent piezoelectric activities and has a high Curie temperature, as shown in Tables 1 to 3, so that the piezoelectric activities may not be lost up to elevated temperature.

The ternary system of $Pb(Li_{1/4}Nb_{3/4})O_3$, $$Pb(Li_{1/4}Ta_{3/4})O_3$$

or $Pb(Li_{1/4}Sb_{3/4})O_3$, $PbTiO_3$ and $PbZrO_3$ of this invention exists in a solid solution in greater parts of compositions and such a solid solution has a perovskite-type crystalline structure. FIGS. 3, 6 and 9 show the crystalline phases of the ceramic compositions falling within the areas A–B–C–D–E–F of FIG. 1, G–H–I–J–K–L–M–N–O of FIG. 4 and P–Q–R–S–T–U of FIG. 7, respectively, as determined at room temperature by the powder method of X-ray analysis. These compositions have a perovskite-type crystalline structure and belong to either the tetragonal phase (indicated by T in the figures) or the rhombohedral phase (indicated by R). The transition boundary of the two phases is shown with a thick line in each figure. In general, the value of $k_r$ is the greatest in the vicinity of this transition boundary.

It will be apparent that the starting materials to be used in manufacture of the ceramic of this invention are not limited to those used in the above examples. In detail, those oxides may be used instead of any starting material of the above examples, which are easily decomposed at elevated temperature to form a required composition. Also, those salts such as oxalates or carbonates (as exemplified by $Li_2CO_3$ for $Li_2O$ described above) may be used instead of the oxides used in the examples, which are easily decomposed into the respective oxides at elevated temperature. Otherwise, hydroxides of the same character as above, such as $Nb(OH)_5$, may be used instead of the oxides such as $Nb_2O_5$. Moreover, an excellent piezoelectric ceramic having similar properties to the above examples is still also obtainable by preparing separately powdered material of each of $$Pb(Li_{1/4}Nb_{3/4})O_3$$

$Pb(Li_{1/4}Ta_{3/4})O_3$ or $Pb(Li_{1/4}Sb_{3/4})O_3$, $PbTiO_3$ and $PbZrO_3$ in advance and by using them as starting materials to be mixed subsequently.

It is usual that tantalum pentoxide ($Ta_2O_5$), niobium pentoxide ($Nb_2O_5$) and zirconium dioxide ($ZrO_2$) which are available in the market contain respectively several percent of niobium pentoxide ($Nb_2O_5$), tantalum pentoxide ($Ta_2O_5$) and hafnium dioxide ($HfO_2$). Accordingly, the ceramic compositions of this invention are allowed to contain small amount of these oxides or elements existing in the materials available in the market. Moreover, it is presumable that addition of a small amount of some additional agent to the ceramic composition of this invention may further improve the piezoelectric properties, from the similar fact recognized in the conventional lead titanate zirconate ceramic. It will be understood from the foregoing that the ceramic composition of this invention may include appropriate additives.

While there have been described what at present are believed to be the preferred examples of this invention, it will be obvious that various modifications can be made therein without departing from the scope of this invention and that this invention covers all the ceramic compositions as specified in the appended claims.

TABLE I

| No. | Mol ratio of composition: $Pb(Li_{1/4}Nb_{3/4})O_3$ x | PbTiO₃ y | PbZrO₃ z | $k_r$, percent | $Q_m$ | ε | Tan δ, percent | Curie temp. (° C.) |
|---|---|---|---|---|---|---|---|---|
| 1 | 0.01 | 0.75 | 0.24 | 4 | 170 | 270 | 2.8 | ---------- |
| 2 | 0.05 | 0.75 | 0.20 | 8 | 220 | 310 | 2.7 | ---------- |
| 3 | 0.10 | 0.75 | 0.15 | 7 | 210 | 330 | 2.3 | ---------- |
| 4 | 0.25 | 0.75 | 0.00 | 5 | 180 | 370 | 3.0 | ---------- |
| 5 | 0.05 | 0.70 | 0.25 | 23 | 350 | 340 | 2.0 | ---------- |
| 6 | 0.10 | 0.70 | 0.20 | 22 | 370 | 330 | 2.5 | ---------- |
| 7 | 0.05 | 0.65 | 0.30 | 28 | 300 | 410 | 2.1 | ---------- |
| 8 | 0.01 | 0.60 | 0.39 | 30 | 105 | 400 | 2.1 | ---------- |
| 9 | 0.10 | 0.60 | 0.30 | 34 | 230 | 520 | 1.8 | ---------- |
| 10 | 0.40 | 0.60 | 0.00 | 14 | 240 | 450 | 2.6 | ---------- |
| 11 | 0.05 | 0.55 | 0.40 | 46 | 160 | 640 | 1.8 | ---------- |
| 12 | 0.50 | 0.50 | 0.00 | 10 | 120 | 280 | 5.2 | ---------- |
| 13 | 0.05 | 0.48 | 0.47 | 60 | 100 | 1,390 | 2.1 | ---------- |
| 14* | 0.10 | 0.48 | 0.42 | 53 | 105 | 1,240 | 2.1 | ---------- |
| 15 | 0.20 | 0.48 | 0.32 | 43 | 135 | 950 | 1.8 | ---------- |
| 16 | 0.30 | 0.48 | 0.22 | 27 | 215 | 570 | 1.8 | ---------- |
| 17 | 0.40 | 0.48 | 0.12 | 16 | 180 | 350 | 1.9 | ---------- |
| 18 | 0.01 | 0.47 | 0.52 | 70 | 70 | 1,510 | 3.1 | ---------- |
| 19 | 0.02 | 0.47 | 0.51 | 78 | 90 | 1,800 | 2.5 | 380 |
| 20 | 0.05 | 0.45 | 0.50 | 75 | 95 | 1,670 | 2.6 | 350 |
| 21* | 0.10 | 0.45 | 0.45 | 63 | 90 | 1,630 | 2.3 | ---------- |
| 22 | 0.05 | 0.43 | 0.52 | 65 | 95 | 690 | 3.3 | ---------- |
| 23 | 0.10 | 0.43 | 0.47 | 70 | 90 | 1,400 | 3.1 | 300 |
| 24 | 0.20 | 0.43 | 0.37 | 55 | 90 | 1,740 | 2.2 | ---------- |
| 25 | 0.10 | 0.40 | 0.50 | 56 | 95 | 780 | 3.8 | ---------- |
| 26 | 0.20 | 0.38 | 0.42 | 59 | 95 | 1,210 | 3.3 | 280 |
| 27 | 0.20 | 0.33 | 0.47 | 48 | 135 | 770 | 3.7 | ---------- |
| 28 | 0.30 | 0.33 | 0.37 | 38 | 180 | 1,180 | 3.5 | 260 |
| 29* | 0.40 | 0.28 | 0.32 | 28 | 180 | 1,030 | 3.1 | ---------- |
| 30 | 0.30 | 0.23 | 0.47 | 26 | 225 | 630 | 4.2 | ---------- |
| 31 | 0.50 | 0.23 | 0.27 | 19 | 70 | 690 | 4.3 | ---------- |
| 32 | 0.05 | 0.20 | 0.75 | 27 | 250 | 380 | 3.7 | ---------- |
| 33 | 0.01 | 0.19 | 0.80 | 22 | 480 | 310 | 4.9 | ---------- |
| 34 | 0.10 | 0.10 | 0.80 | 21 | 330 | 420 | 4.0 | ---------- |
| 35 | 0.20 | 0.10 | 0.70 | 21 | 300 | 510 | 4.4 | ---------- |
| 36 | 0.50 | 0.10 | 0.40 | 8 | 240 | 340 | 1.2 | ---------- |
| 37 | 0.01 | 0.09 | 0.90 | 15 | 380 | 260 | 4.6 | ---------- |
| 38 | 0.05 | 0.05 | 0.90 | 14 | 460 | 310 | 3.8 | ---------- |
| 39 | 0.20 | 0.05 | 0.75 | 14 | 270 | 520 | 5.0 | ---------- |
| 40 | 0.40 | 0.05 | 0.55 | 26 | 300 | 370 | 4.6 | ---------- |
| 41 | 0.10 | 0.00 | 0.90 | 7 | 480 | 370 | 2.7 | ---------- |
| 42 | 0.30 | 0.00 | 0.70 | 8 | 170 | 450 | 6.0 | ---------- |
| 43 | 0.50 | 0.00 | 0.50 | 3 | 160 | 260 | 5.3 | ---------- |

* See footnote Table 3.

TABLE 2

| No. | Mol ratio of composition: $Pb(Li_{1/4}Ta_{3/4})O_3$ x | PbTiO₃ y | PbZrO₃ z | $k_r$, percent | $Q_m$ | ε | Tan δ, percent | Curie temp. (° C.) |
|---|---|---|---|---|---|---|---|---|
| 1 | 0.05 | 0.70 | 0.25 | 23 | 320 | 370 | 1.9 | ---------- |
| 2 | 0.10 | 0.70 | 0.20 | 23 | 270 | 390 | 2.5 | ---------- |
| 3 | 0.20 | 0.65 | 0.15 | 17 | 350 | 350 | 1.9 | ---------- |
| 4 | 0.01 | 0.60 | 0.39 | 29 | 170 | 440 | 3.1 | ---------- |
| 5* | 0.05 | 0.55 | 0.40 | 40 | 150 | 710 | 2.1 | ---------- |
| 6 | 0.01 | 0.48 | 0.51 | 64 | 90 | 1,100 | 1.8 | ---------- |
| 7 | 0.05 | 0.48 | 0.47 | 58 | 100 | 1,340 | 2.5 | ---------- |
| 8* | 0.10 | 0.48 | 0.42 | 55 | 105 | 1,350 | 2.9 | ---------- |
| 9 | 0.20 | 0.48 | 0.32 | 39 | 130 | 1,020 | 2.2 | ---------- |
| 10 | 0.30 | 0.48 | 0.22 | 19 | 240 | 500 | 2.0 | ---------- |
| 11 | 0.02 | 0.47 | 0.51 | 80 | 85 | 1,470 | 2.7 | ---------- |
| 12 | 0.05 | 0.46 | 0.49 | 71 | 85 | 1,420 | 2.8 | 340 |
| 13 | 0.10 | 0.46 | 0.44 | 57 | 95 | 1,350 | 3.1 | ---------- |
| 14 | 0.05 | 0.43 | 0.52 | 60 | 95 | 770 | 2.8 | ---------- |
| 15 | 0.10 | 0.43 | 0.47 | 55 | 95 | 1,010 | 3.8 | 290 |
| 16* | 0.20 | 0.43 | 0.37 | 47 | 110 | 1,540 | 2.5 | ---------- |
| 17 | 0.10 | 0.40 | 0.50 | 51 | 110 | 850 | 3.8 | ---------- |
| 18 | 0.20 | 0.38 | 0.42 | 44 | 110 | 1,140 | 3.7 | 255 |
| 19 | 0.40 | 0.35 | 0.25 | 12 | 250 | 410 | 6.2 | ---------- |
| 20 | 0.05 | 0.33 | 0.62 | 38 | 160 | 560 | 3.4 | ---------- |
| 21 | 0.20 | 0.33 | 0.47 | 38 | 140 | 900 | 4.3 | ---------- |
| 22* | 0.30 | 0.33 | 0.37 | 39 | 115 | 1,120 | 4.1 | 240 |
| 23 | 0.30 | 0.23 | 0.47 | 26 | 190 | 780 | 4.6 | ---------- |
| 24 | 0.05 | 0.20 | 0.75 | 27 | 250 | 410 | 4.0 | ---------- |
| 25 | 0.40 | 0.20 | 0.40 | 8 | 230 | 360 | 6.4 | ---------- |
| 26 | 0.10 | 0.10 | 0.80 | 12 | 430 | 650 | 4.6 | ---------- |
| 27 | 0.01 | 0.09 | 0.90 | 18 | 530 | 280 | 4.8 | ---------- |
| 28 | 0.05 | 0.05 | 0.90 | 12 | 380 | 350 | 6.3 | ---------- |
| 29 | 0.10 | 0.05 | 0.85 | 8 | 340 | 460 | 6.5 | ---------- |

* See footnote Table 3.

TABLE 3

| No. | Mol ratio of composition $Pb(Li_{1/4}Sb_{3/4})O_3$ x | $PbTiO_3$ y | $PbZrO_3$ z | $k_r$, percent | $Q_m$ | ϵ | Tan δ, percent | Curie temp. (° C.) |
|---|---|---|---|---|---|---|---|---|
| 1 | 0.01 | 0.70 | 0.29 | 6 | 210 | 390 | 2.4 | |
| 2 | 0.05 | 0.70 | 0.25 | 22 | 320 | 360 | 1.9 | |
| 3 | 0.10 | 0.70 | 0.20 | 10 | 410 | 320 | 2.8 | |
| 4 | 0.01 | 0.60 | 0.39 | 32 | 180 | 460 | 1.9 | |
| 5* | 0.05 | 0.55 | 0.40 | 43 | 130 | 810 | 1.2 | |
| 6 | 0.30 | 0.50 | 0.20 | 10 | 280 | 170 | 3.5 | |
| 7 | 0.05 | 0.48 | 0.47 | 70 | 90 | 1,810 | 1.4 | |
| 8* | 0.10 | 0.48 | 0.42 | 54 | 120 | 1,640 | 1.3 | |
| 9 | 0.20 | 0.48 | 0.32 | 25 | 180 | 630 | 1.9 | |
| 10 | 0.02 | 0.47 | 0.51 | 80 | 80 | 1,190 | 1.4 | 355 |
| 11 | 0.05 | 0.46 | 0.49 | 71 | 87 | 965 | 3.1 | 310 |
| 12 | 0.10 | 0.46 | 0.44 | 66 | 90 | 1,620 | 1.9 | |
| 13 | 0.05 | 0.43 | 0.52 | 61 | 95 | 790 | 2.1 | |
| 14 | 0.10 | 0.43 | 0.47 | 63 | 95 | 1,010 | 2.1 | 260 |
| 15* | 0.20 | 0.43 | 0.37 | 35 | 160 | 1,210 | 1.4 | |
| 16 | 0.10 | 0.40 | 0.50 | 53 | 110 | 870 | 2.3 | |
| 17 | 0.20 | 0.38 | 0.42 | 32 | 170 | 1,030 | 2.5 | 240 |
| 18 | 0.05 | 0.33 | 0.62 | 44 | 140 | 640 | 2.2 | |
| 19 | 0.20 | 0.33 | 0.47 | 26 | 170 | 830 | 2.9 | |
| 20* | 0.30 | 0.33 | 0.37 | 20 | 340 | 700 | 2.6 | 225 |
| 21 | 0.30 | 0.23 | 0.47 | 11 | 320 | 570 | 2.6 | |
| 22 | 0.05 | 0.20 | 0.75 | 28 | 270 | 450 | 2.4 | |
| 23 | 0.10 | 0.10 | 0.80 | 15 | 370 | 640 | 4.4 | |
| 24 | 0.30 | 0.10 | 0.60 | 7 | 250 | 490 | 4.7 | |
| 25 | 0.01 | 0.09 | 0.90 | 16 | 470 | 270 | 4.4 | |
| 26 | 0.05 | 0.05 | 0.90 | 9 | 530 | 370 | 2.2 | |
| 27 | 0.20 | 0.05 | 0.75 | 6 | 360 | 490 | 4.1 | |
| 28 | 0.30 | 0.05 | 0.65 | 8 | 110 | 450 | 5.6 | |

* In manufacture of the specimens with the asterisked Nos. in Tables 1 through 3, trilead tetroxide ($Pb_3O_4$) was used instead of lead monoxide (PbO) as one of the starting materials.

TABLE 4

| No. | Mol ratio of composition $PbTiO_3$ | $PbZrO_3$ | $k_r$, percent | $Q_m$ | ϵ | Tan δ, percent |
|---|---|---|---|---|---|---|
| 1 | 0.70 | 0.30 | | | 340 | 5.7 |
| 2 | 0.60 | 0.40 | | | 300 | 2.4 |
| 3 | 0.55 | 0.45 | 8 | 30 | 350 | 1.3 |
| 4 | 0.48 | 0.52 | 42 | 250 | 1,060 | 1.6 |
| 5 | 0.45 | 0.55 | 38 | 290 | 640 | 3.0 |
| 6 | 0.40 | 0.60 | 30 | 320 | 460 | 3.1 |
| 7 | 0.30 | 0.70 | 24 | 380 | 380 | 3.3 |
| 8 | 0.20 | 0.80 | 15 | 470 | 350 | 3.3 |
| 9 | 0.10 | 0.90 | 10 | 580 | 280 | 3.4 |

NOTE.—For the specimens Nos. 1 and 2, the evaluation of piezoelectric activities was impossible.

What is claimed is:

1. A piezoelectric ceramic consisting essentially of the composition which is represented by the formula $$[Pb(Li_{1/4}Z_{3/4})O_3]_x[PbTiO_3]_y[PbZrO_3]_z$$

where $x$, $y$ and $z$ represent a set of mol ratios and $x+y+z=1.00$ and where Z represents one element selected from the group consisting of Nb, Ta and Sb, and which falls within the area A–B–C–D–E–F of FIG. 1 of the drawing where Nb is selected for Z, within the area G–H–I–J–K–L–M–N–O of FIG. 4 of the drawing where Ta is selected for Z, and within the area P–Q–R–S–T–U of FIG. 7 of the drawing where Sb is selected for Z, the sets of mol ratios of the vertices of said areas being as follows:

| | x | y | z |
|---|---|---|---|
| A | 0.01 | 0.75 | 0.24 |
| B | 0.01 | 0.09 | 0.90 |
| C | 0.10 | 0.00 | 0.90 |
| D | 0.50 | 0.00 | 0.50 |
| E | 0.50 | 0.50 | 0.00 |
| F | 0.25 | 0.75 | 0.00 |
| G | 0.01 | 0.60 | 0.39 |
| H | 0.01 | 0.09 | 0.90 |
| I | 0.05 | 0.05 | 0.90 |
| J | 0.10 | 0.05 | 0.85 |
| K | 0.40 | 0.20 | 0.40 |
| L | 0.40 | 0.35 | 0.25 |
| M | 0.20 | 0.65 | 0.15 |
| N | 0.10 | 0.70 | 0.20 |
| O | 0.05 | 0.70 | 0.25 |
| P | 0.01 | 0.70 | 0.29 |
| Q | 0.01 | 0.09 | 0.90 |
| R | 0.05 | 0.05 | 0.90 |
| S | 0.30 | 0.05 | 0.65 |
| T | 0.30 | 0.50 | 0.20 |
| U | 0.10 | 0.70 | 0.20 |

2. The piezoelectric ceramic of claim 1, wherein the composition is represented by the formula $$[Pb(Li_{1/4}Ta_{3/4})O_3]_x[PbTiO_3]_y[PbZrO_3]_z$$

where $x$, $y$ and $z$ represent a set of mol ratios and $$x+y+z=1.00$$

and which falls within the area G–H–I–J–K–L–M–N–O of FIG. 4 of the drawing; where the sets of mol ratios of the mol ratios of the vertices of said areas being as follows:

| | x | y | z |
|---|---|---|---|
| G | 0.01 | 0.60 | 0.39 |
| H | 0.01 | 0.09 | 0.90 |
| I | 0.05 | 0.05 | 0.90 |
| J | 0.10 | 0.05 | 0.85 |
| K | 0.40 | 0.20 | 0.40 |
| L | 0.40 | 0.35 | 0.25 |
| M | 0.20 | 0.65 | 0.15 |
| N | 0.10 | 0.70 | 0.20 |
| O | 0.05 | 0.70 | 0.25 |

3. The piezoelectric ceramic of claim 1, wherein the composition is represented by the formula $$[Pb(Li_{1/4}Sb_{3/4})O_3]_x[PbTiO_3]_y[PbZrO_3]_z$$

where $x$, $y$ and $z$ represent a set of mol ratios and $$x+y+z=1.00$$

and which falls within the area P–Q–R–S–T–U of FIG. 7 of the drawing; the sets of mol ratios of the vertices of said areas being as follows:

| | x | y | z |
|---|---|---|---|
| P | 0.01 | 0.70 | 0.29 |
| Q | 0.01 | 0.09 | 0.90 |
| R | 0.05 | 0.05 | 0.90 |
| S | 0.30 | 0.05 | 0.65 |
| T | 0.30 | 0.50 | 0.20 |
| U | 0.10 | 0.70 | 0.20 |

4. A piezoelectric ceramic consisting essentially of the composition which is represented by the formula $$Pb(Li_{1/4}Nb_{3/4})O_{3x}PbTiO_{3y}PbZrO_{3z}$$

where $x$, $y$, and $z$ represent a set of mol ratios and $$x+y+z=1.00$$

and which falls within the area A–B–C–D–E–F of FIG. 1 of the drawing; the sets of mol ratios of the vertices of said area being as follows:

| | x | y | z |
|---|---|---|---|
| A | 0.01 | 0.75 | 0.24 |
| B | 0.01 | 0.09 | 0.90 |
| C | 0.10 | 0.00 | 0.90 |
| D | 0.50 | 0.00 | 0.50 |
| E | 0.50 | 0.50 | 0.00 |
| F | 0.25 | 0.75 | 0.00 |

References Cited

UNITED STATES PATENTS 3,268,453 8/1966 Ouchi et al. ---------- 252—62.9
3,268,783 8/1966 Saburi ---------------- 106—39
3,400,076 9/1968 Ouchi et al. ---------- 252—62.9

TOBIAS E. LEVOW, Primary Examiner

J. COOPER, Assistant Examiner

U.S. Cl. X.R.

106—39R